(12) United States Patent
Gomez-Casado et al.

(10) Patent No.: US 10,386,386 B2
(45) Date of Patent: Aug. 20, 2019

(54) FIXING MECHANISM ACTUATABLE WITHOUT A TOOL AND WHICH FIXES A MEASURING PROBE IN A DETACHABLE MANNER FOR A SCANNING PROBE MICROSCOPE

(71) Applicant: Anton Paar GmbH, Graz (AT)

(72) Inventors: Alberto Gomez-Casado, Graz (AT); Norbert Rath, Graz (AT)

(73) Assignee: Anton Paar GmbH, Graz (AT)

( * ) Notice: Subject to any disclaimer, the term of this patent is extended or adjusted under 35 U.S.C. 154(b) by 103 days.

(21) Appl. No.: 15/240,148

(22) Filed: Aug. 18, 2016

(65) Prior Publication Data

US 2017/0067935 A1    Mar. 9, 2017

(30) Foreign Application Priority Data

Aug. 19, 2015 (AT) .................................. 549/2015

(51) Int. Cl.
*G01Q 70/02* (2010.01)
(52) U.S. Cl.
CPC ................... *G01Q 70/02* (2013.01)
(58) Field of Classification Search
CPC .............................. G01Q 70/02; B25B 11/002
See application file for complete search history.

(56) References Cited

U.S. PATENT DOCUMENTS

| | | | |
|---|---|---|---|
| 5,376,790 A * | 12/1994 | Linker | G01Q 10/04 250/307 |
| 5,598,104 A * | 1/1997 | Boyette, Jr. | G01R 1/04 269/8 |
| 5,705,814 A * | 1/1998 | Young | G01Q 30/06 250/307 |
| 5,717,132 A | 2/1998 | Watanabe et al. | |
| 5,952,657 A | 9/1999 | Alexander et al. | |
| 6,057,546 A | 5/2000 | Braunstein et al. | |
| 6,093,930 A | 6/2000 | Boyette, Jr. et al. | |
| 6,176,122 B1 | 1/2001 | Shimizu et al. | |
| 6,435,015 B1 * | 8/2002 | Yamamoto | B82Y 35/00 73/105 |
| 6,912,893 B2 | 7/2005 | Minne et al. | |
| 7,375,322 B2 | 5/2008 | Kitajima et al. | |

(Continued)

FOREIGN PATENT DOCUMENTS

EP    0 564 088 A1    10/1993
EP    1 012 862 B1    11/2007

(Continued)

OTHER PUBLICATIONS

Search Report in GB1614129.3, Intellectual Property Office, UK IPO, dated Feb. 21, 2017.

*Primary Examiner* — Wyatt A Stoffa
(74) *Attorney, Agent, or Firm* — Robert A. Blaha; Smith Tempel Blaha LLC

(57) ABSTRACT

A fixing device selectively fixes a measuring probe of a scanning probe microscope. The fixing device comprises an inserting unit in which the measuring probe is insertable and a master force unit for selectively exerting a master force onto a fixing mechanism. The fixing mechanism is actuatable without a tool. The fixing mechanism is enabled or disabled to controllably detach or fix the measuring probe when the measuring probe is inserted in the inserting unit.

20 Claims, 4 Drawing Sheets

(56) References Cited

U.S. PATENT DOCUMENTS

| | | | |
|---|---|---|---|
| 7,648,130 B2* | 1/2010 | Lancaster-Larocque | B25B 5/04 269/6 |
| 8,099,793 B2 | 1/2012 | Jo et al. | |
| 8,925,111 B1 | 12/2014 | Park et al. | |
| 9,372,203 B1* | 6/2016 | Massie | G01Q 70/02 |
| 2003/0007242 A1* | 1/2003 | Schwartz | B82Y 35/00 359/395 |
| 2004/0206165 A1 | 10/2004 | Minne et al. | |
| 2005/0283953 A1* | 12/2005 | Jeffrey | A47K 10/14 24/303 |
| 2007/0200038 A1* | 8/2007 | Dautrey | B25B 5/06 248/206.5 |
| 2007/0284795 A1* | 12/2007 | Lancaster-Larocque | B25B 5/04 269/8 |
| 2008/0149829 A1* | 6/2008 | Jo | G01Q 70/02 250/306 |
| 2010/0037360 A1* | 2/2010 | Jo | G01Q 70/02 850/53 |
| 2011/0124027 A1* | 5/2011 | Gabi | B01L 3/0244 435/29 |
| 2014/0380532 A1 | 12/2014 | Park et al. | |

FOREIGN PATENT DOCUMENTS

| | | |
|---|---|---|
| WO | WO 97/08733 A1 | 3/1997 |
| WO | WO 98/10485 A1 | 3/1998 |

* cited by examiner

FIXING MECHANISM ACTUATABLE WITHOUT A TOOL AND WHICH FIXES A MEASURING PROBE IN A DETACHABLE MANNER FOR A SCANNING PROBE MICROSCOPE

CROSS-REFERENCE TO RELATED APPLICATIONS

This application claims the benefit of the filing date of Austrian Patent Application No. A 549/2015 filed 19 Aug. 2015, the disclosure of which is hereby incorporated herein by reference in its entirety.

TECHNICAL FIELD

Embodiments of the invention relate to a fixing unit, a scanning probe microscope and a method for fixing a measuring probe of a scanning probe microscope.

TECHNICAL BACKGROUND

A scanning force microscope mainly serves for a lateral and vertical high-resolution examination of surfaces, respectively (in particular a topographic examination of surfaces). A measuring probe includes, for example, a leaf spring or cantilever with a nanoscopically small needle (also referred to as measuring tip or measuring probe tip). The needle or measuring probe tip is guided (i.e., scanned) over the surface and the deflection of the cantilever is detected based on the interaction of the cantilever with the surface. Depending on a surface condition of the sample, the deflection of the cantilever is recorded and scanned, respectively, in a position-dependent manner and/or the tracking of the probe is recorded and scanned, respectively. The deflection of the cantilever and the tip, respectively, may be measured capacitively (in particular piezo electrically) or by optical sensors. This method enables a structural examination of the surface of the sample up to an atomic resolution. The distance of the cantilever to the surface of the sample to be examined can be adjusted very accurately. Thereby, different measuring methods, for example contact mode, non-contact mode, tapping mode, sensing mode (e.g., in an atomic force microscope (AFM)), etc. can be realized.

Depending on the operation mode, besides attracting long-range Van der Waals forces and capillary forces, also strong repelling forces with low range can be used in order to obtain topographical information or chemical information of the sample surface. Furthermore, sample properties such as electrical conductivity, surface charges, elastic modulus, adhesion, electrochemical potential, piezo electrical properties, infrared absorption and/or temperature phase transitions can be determined. In addition, scanning force microscopes are also used as magnetic force microscope, friction force microscope, current-voltage microscopes or also scanning-Kelvin-microscopes. Depending on the purpose of a scanning probe microscope, besides measuring probes made of silicon and silicon nitride, respectively, different coated measuring probes may be used (for example gold coated, platinum coated or carbon coated measuring probes). The coating of the measuring probes is usually performed at the bottom side, thus that side at which the measuring tip is located. Coating processes in which the entire measuring probe is coated usually do not guarantee a continuous contacting between top side and bottom side. Then, an electrical contacting of the bottom side of the sample with the scanning probe microscope is to be realized. It shall be ensured that the transition resistance between scanning probe microscope and measuring probe does not significantly change over the lifetime of the device.

General prior art which relates to the mounting of a measuring probe to a scanning probe microscope is disclosed in EP 1,012,862 and U.S. Pat. No. 5,717,132.

Conventionally, it is still a challenge to handle a sensitive measuring probe of a scanning probe microscope and to exchange, if necessary, without impairing the reproducibility and accuracy during operation of the scanning probe microscope.

SUMMARY

There may be a need to provide a possibility to handle a measuring probe of a scanning probe microscope simply and protected against damage.

The subject-matters with the features according to the independent patent claims are provided. Further embodiments are shown in the dependent claims.

According to an embodiment of the present invention, a fixing device for selectively fixing a measuring probe of a scanning probe microscope is provided, wherein the fixing device comprises an inserting unit in which the measuring probe is insertable, a master force unit (in particular a unit which is separate from the inserting unit, for generating a master force, if necessary) and a fixing mechanism. The master force unit selectively exerts a master force on the fixing mechanism, which is actuatable without a tool, for detaching and/or fixing the measuring probe which is inserted in the inserting unit.

According to a further embodiment of the present invention, a scanning probe microscope for determining a surface information with respect to a sample body by means of scanningly sensing a surface of the sample body is provided, wherein the scanning probe microscope comprises a measuring probe which is adapted for scanningly sensing the surface of the sample body, and a fixing device with the above described features for fixing the measuring probe.

According to a further exemplary embodiment, a method for fixing a measuring probe of a scanning probe microscope is provided, wherein in the method the measuring probe is inserted into an inserting unit of the scanning probe microscope, and a fixing mechanism for detaching and/or fixing the measuring probe which is inserted in the inserting unit is actuated without a tool by means of a (in particular an external) master force.

According to an exemplary embodiment of the invention, a robust fixing device for a measuring probe of a scanning probe microscope is provided which at the same time is utilizable for many different measuring probe types and measuring methods in scanning probe microscopy, respectively, and which makes the measuring probe exchangeable without destruction. An embodiment of the invention enables the user to exchange the measuring probe without the need for using external tools (for example screwdrivers) or other mounting auxiliary bodies (for example fixing clips or levers) and minute fixing means (for example screws), respectively. This increases the user convenience in conjunction with mounting and exchanging a measuring probe. Through the cooperation of an intuitively handable or manipulable inserting unit, a reversibly acting fixing mechanism and preferably a contactlessly acting master force unit for force-based control of the fixing mechanism, handling of the measuring probe may be simplified, such that an undesired mechanical destruction of the fixing device may be avoided and misplacement of the measuring probe may be prevented. For this purpose, embodiments of the invention adopt the functional principle that, with a master force unit which is provided separately opposing the inserting unit, the fixing mechanism for switching on and/or switching off a fixing force is subjected to a super ordinated master force under whose influence the measuring probe, by means of the fixing mechanism, can be selectively fixed to the inserting unit or detached from the inserting unit. The master force generated by the master force unit can superimpose a fixing force on the fixing mechanism (in particular superimpose on the fixing mechanism a weakening force or even an eliminating or counteracting force), such that no resulting fastening force or fixing force acts upon the measuring probe anymore and the measuring probe is thus detached.

BRIEF DESCRIPTION OF THE DRAWINGS

In the following, exemplary embodiments of the present invention are described in detail with reference to the following figures.

EXEMPLARY EMBODIMENTS

Figure 1:
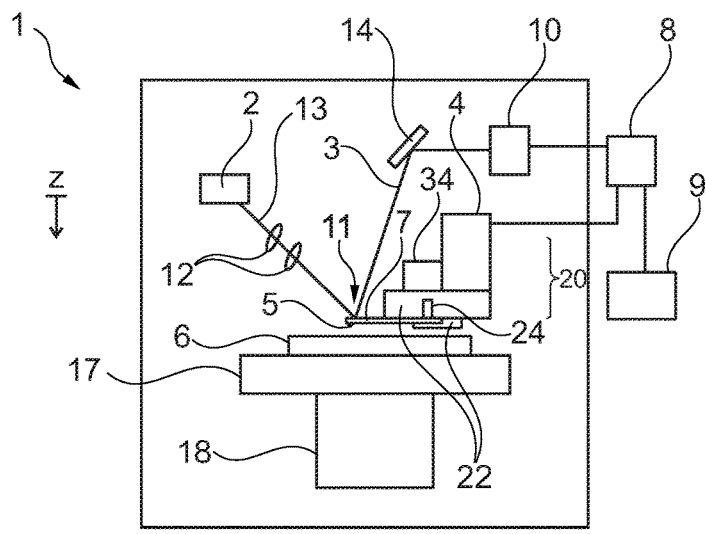
FIG. 1 shows a scanning probe microscope according to an exemplary embodiment of the invention.

In the context of the present application, the term "master force unit" denotes in particular a force generation unit which is configured for (for example, machine controlled or user controlled) generating a (preferably separated from the inserting unit and/or from the fixing unit) temporarily acting master force, if necessary. This may enable a contact-freely (or contactless), tool-freely (or tool less) and/or auxiliary body-freely (or body less) and therefore reproducible fixing of the measuring probe to and detaching of the measuring probe from the inserting unit, respectively. Such a master force may be optionally switched on or switched off.

In the context of the present application, the term "actuatable without a tool" in particular denotes that a user, for attaching the measuring probe to the fixing device and for removing the measuring probe from the fixing device, does not need to use a tool (for example a screwdriver) or other auxiliary means beyond the fixing device.

In the context of the present application, the term "fixing in a detachable manner" in particular denotes that the measuring probe in a fixing state (or fixed state) of the fixing device is firmly attached to the inserting unit and, when forces act during scanning of a surface of a sample body, the measuring probe is not undesirably detached from the inserting unit; and that in a detaching state (or detached state) of the fixing device, the measuring probe can be removed without destruction (i.e., contactlessly or contact free without destruction of the fixing device, the measuring probe and/or other components) and substantially force-freely (without restriction) from the inserting unit of the fixing device.

In the context of the present application, the term "scanning probe microscope" in particular denotes a microscope in which an image or another surface information of a sample body is not generated by means of an optical or electro-optical picture (i.e., not generated by using lenses), but via the interaction of a measuring probe with the sample body. The sample surface to be examined is scanned point by point by means of this measuring probe in a scanning process. A measured value or values yielded for each respective point may then be assembled to generate an image or such measured values can be evaluated in another way.

In the following, additional exemplary embodiments of the fixing device, the scanning probe microscope and the method are described.

According to an embodiment, the master force unit can be independent from the rest of the device (i.e., the rest of the scanning probe microscope) or can be integrated in this device. In contrast, the fixing mechanism usually, but not mandatory, forms a part of this device.

According to an embodiment of the invention, the master force unit can be configured for controlling the detaching and/or fixing by means of exerting an adjustable master force, in particular for selectively activating (for example by switching on a current source for energizing an electromagnet for generating a magnetic master force or spatially converging a permanent magnet to the fixing unit) or deactivating (for example by switching off the current source or by spatially withdrawing the permanent magnet from the fixing unit) the detaching. In this way, a precise adjustment of the respectively acting master force is possible. Exerting an excessive force or an ineffective force acting on the measuring probe can be prevented by means of a such self-acting control. The sensitive measuring probe can thus be protected from damage.

According to an embodiment of the invention, the fixing mechanism may be configured for, when the master force is switched off, activating the fixing and, when the master force is switched on, deactivating the fixing for inserting the measuring probe in the inserting unit or for removing the measuring probe from the inserting unit. The external master force may be optionally entirely switched off, wherein in the meantime the fixing may be maintained. Then, only by means of actively switching on the external master force, detaching of the measuring probe can be performed. Due to such control logic, an undesired and unintended detaching, respectively, of the measuring probe (for example in case of a power failure) may be avoided, since only then an active control measure causes the detaching. Alternatively, the switching logic can be inverted, such that when the master force is switched off, the measuring probe is free and when the master force is switched on, the measuring probe is fixed to the fixing device.

According to an embodiment of the invention, the master force unit for exerting the master force may be selected from the group consisting of a magnetic master force unit for generating a magnetic master force (in particular applicable by means of a movable master force permanent magnet or by means of an electrically enabled master force electromagnet), a hydraulic master force unit for generating a hydraulic master force, a pneumatic master force unit for generating a pneumatic master force, an electrical master force unit for generating an electrical master force, a thermal master force unit for generating a thermal master force and a mechanical master force unit for generating a mechanical master force. All these force generation mechanisms may be selectively and controllably implemented, such that acting of an excessive force or an ineffective fastening force is advantageously made impossible. In other words, by means of such a force generation mechanism which is functionally separated from the inserting unit, an objectively correct amount of force can be expended and an incorrect operation of the sensitive measuring probe can be prevented.

According to an embodiment of the invention, the inserting unit may comprise a curved, in particular spherically curved holding force enhancement element (for example a force transmission sphere) which, in a state of the measuring probe inserted in the inserting unit, with a curved, in particular spherically curved, surface directly acts upon, in particular upon the top side, of the measuring probe. This has the advantage, that the force effect via the holding force enhancement element onto the measuring probe may substantially be performed at a desired point (or point-shapedly), such that the fixing force exerted by means of the fixing mechanism may act upon the measuring probe at an accurately controlled position and with a spatially concentrated and focused effect, respectively. The further advantage is that therefore a simple electrical contacting of the measuring probe at the bottom side (the side which also contains the measuring tip) is enabled. This ensures a reliable fixing of the measuring probe.

According to an embodiment of the invention, the fixing mechanism may comprise at least two magnetic elements whose magnetic interacting force is configured for clampingly fixing the measuring probe which is inserted in the inserting unit. Such an embodiment is for example shown in FIG. 2. When one of the magnetic elements (for example in a recess of a housing or a fixing body) is immobilized and the other or a remaining one of the magnetic elements can freely move (for example in the recess of the housing or in the fixing body), by means of the magnetic interacting of the at least two magnetic elements, a force can be generated which acts in a fastening manner upon the measuring probe which is inserted in the inserting unit. In order to be able to remove the measuring probe from the inserting unit, an associated master force unit, a further magnetic field generation unit (for example a movable permanent magnet or an electromagnet) may be used which superimposes a super ordinated magnetic force to the magnetic forces which are already acting, by means of which super ordinated magnetic force, one of the magnetic elements which is directly or indirectly acting on the measuring probe is rejected under release of the measuring probe.

According to an embodiment of the invention, at least two magnetic elements may be configured to repel each other due to their magnetic interacting force and to act upon the measuring probe which is inserted in the inserting unit, such that the measuring probe is clampingly fixed in the inserting unit. In other words, the repulsive force between two or more magnetic elements may be converted in a clamping force which is acting upon the measuring probe.

Figure 2:
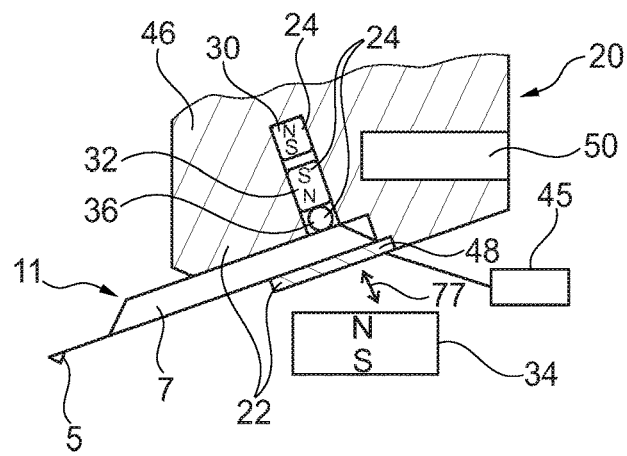
FIG. 2, FIG. 3, FIG. 4, FIG. 5, FIG. 6, FIG. 7, FIG. 8, FIG. 9, FIG. 10 and FIG. 11 show different fixing devices according to exemplary embodiments of the invention.

According to an embodiment of the invention, at least two magnetic elements may be arranged in and/or at the same of two opposing fixing bodies of the fixing device, between which the measuring probe is arranged in the state inserted in the inserting unit. Such an embodiment is shown in FIG. 2, for example. Further in particular, two or more magnetic elements may be arranged in an upper part of the inserting unit. In that case, a lower part of the inserting unit may be formed from an electrically conductive material, if necessary, in order to detect an electrical signal from the measuring probe or to specify the electrical potential of the measuring probe tip.

According to an embodiment of the invention, each of the two magnetic elements may be arranged in and/or at another of two opposing fixing bodies of the fixing device, between which the measuring probe is arranged in the state inserted in the inserting unit. Respective embodiments are shown in FIG. 3 through FIG. 6. Each of the magnetic elements may be movable, or one or more may be stationary and/or one or more remaining magnetic elements may be movable. At least one of the magnetic elements which is formed in a lower part or as lower part of the inserting unit is preferably stationary. It may also be configured as an electrically conductive magnet (in particular as an electrically conductive ferromagnetic element in combination with a permanent magnet), in order to be enabled to also detect electrical signals of the measuring probe.

Figure 6:
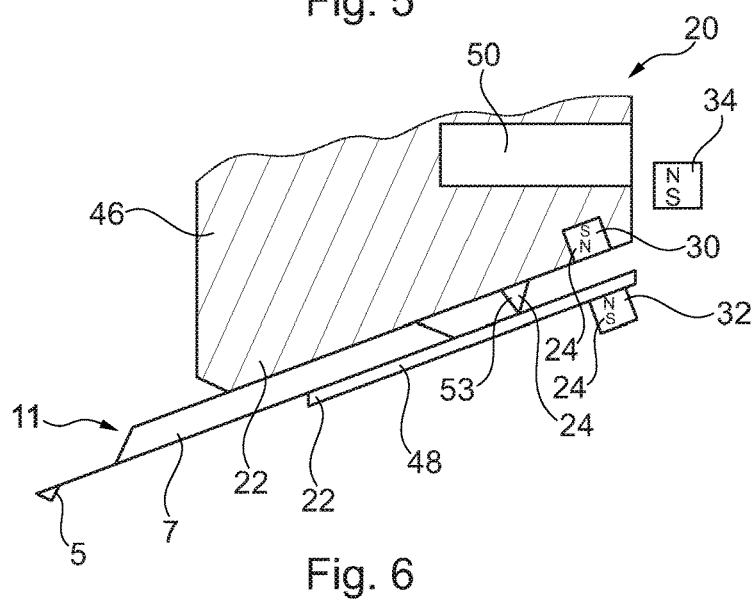

Still referring to the previously described embodiment, the clampingly fixing of the measuring probe in the inserting unit may be performable by means of a rotating lever mechanism. A respective embodiment is shown in FIG. 6. Two magnetic elements in a measuring tip-distal end region of the inserting unit may be configured magnetically repelling each other, in order to, after a force transmission by means of a rotating lever in a measuring tip-near end region of the inserting unit, clampingly fasten two opposing main surfaces of the measuring probe under engagement of the same.

According to an embodiment of the invention, the two magnetic elements may be configured to attract each other due to their magnetic interacting force and to act upon the measuring probe which is inserted in the inserting unit, such that the measuring probe is clampingly fixed in the inserting unit. Detaching the measuring probe from the inserting unit in that case requires to superimpose the magnetic attracting force of the two magnetic elements by a repelling master force, in particular a repelling magnetic master force.

According to an embodiment of the invention, each of the two magnetic elements may be arranged in and/or at another of two opposing fixing bodies of the fixing device, between which the measuring probe is arranged in the state inserted in the inserting unit. Thereby, the space requirement for accommodating the magnetic elements between the different fixing bodies can be uniformly distributed.

According to an embodiment of the invention, one of the magnetic elements may be mounted movably and the other one of the magnetic elements may be mounted immovably in and/or at the fixing device. The reduction of the number of movable parts advantageously also reduces the mechanical effort for manufacturing the fixing device.

Figure 7:
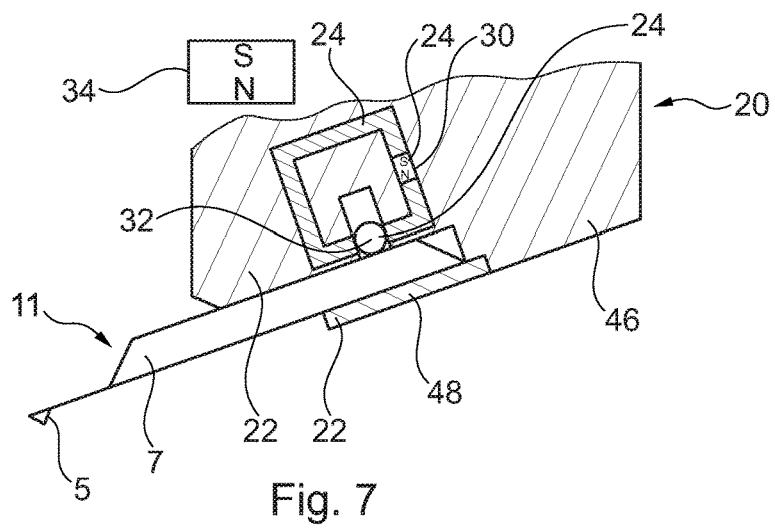

According to an embodiment of the invention, one of the magnetic elements forms a part of a magnetic circuit with an air path and the other one of the magnetic elements is movably arranged in the air path and is pulled out of the air path under the influence of a magnetic force. A respective embodiment is shown in FIG. 7. Such a system is biased in a state fixing the measuring probe. Such a system can release the measuring probe by exerting an additional magnetic force by means of an external magnetic master force unit, which over compensates the fixing force.

According to an embodiment of the invention, the fixing mechanism may comprise an element which is curved in the absence of a master force generated by the master force unit, which element is configured, when the master force is acting, to become at least partially uncurved and thereby, under formation of a clamping fixing of the measuring probe, to extend up to an accommodation cavity of the measuring probe in the inserting unit. Descriptively, such a curved element may function as a leaf spring which only extends in an accommodation cavity of the inserting unit under deflection when activating the master force and thus clampingly fastens the measuring probe. Switching off the master force transfers the curved element back in the curved state and thus detaches the clamping fastening of the measuring probe.

According to an embodiment of the invention, the curved element may comprise a magnetic material which, when a magnetic master force which is generated by means of the master force unit is acting, becomes at least partially uncurved. Such an embodiment is shown in FIG. 7. For example, the curved element may consist of permanent magnetic and/or ferromagnetic material.

Figure 8:
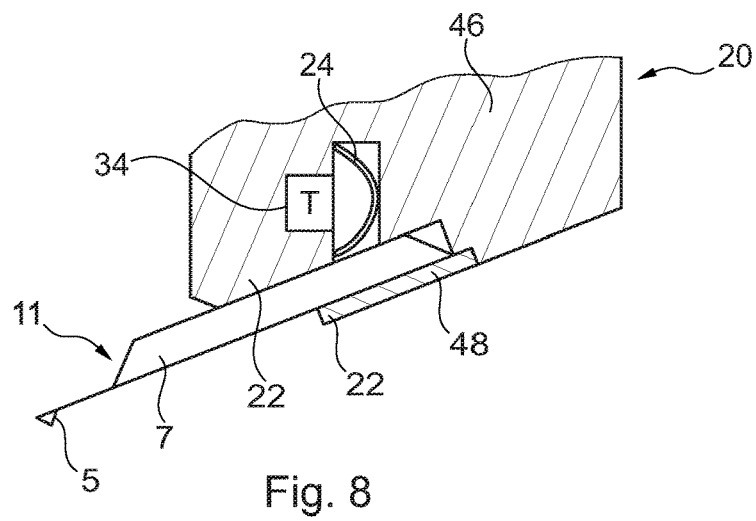

According to an embodiment of the invention, the curved element may comprise a material (for example Nitinol) with a shape memory, which, when a thermal master force which is generated by means of the master force unit is acting, becomes at least partially uncurved. Such an embodiment is shown in FIG. 8. For example, an associated master force unit may be configured as a heat source which can be activated, if necessary, and thereby increases the temperature of the curved element above a threshold temperature, from which the curved element is transferred from a shape memory stored or curved state to another state (less curved or relatively uncurved), in which the element projects into an accommodation cavity of the inserting unit and thereby clampingly fixes the measuring probe. Switching off the heating or application of an active cooling may re-transfer the element in the curved state or shape memory stored state and detach the measuring probe.

Figure 10:
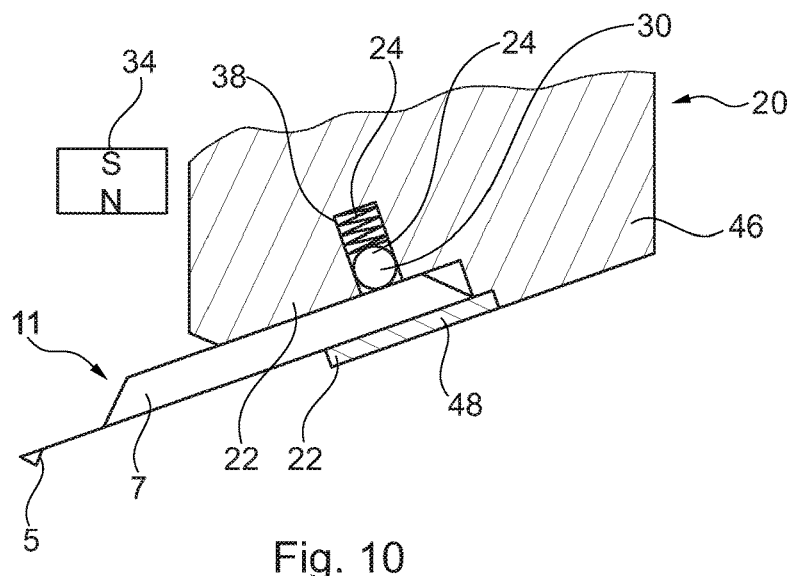
Figure 11:
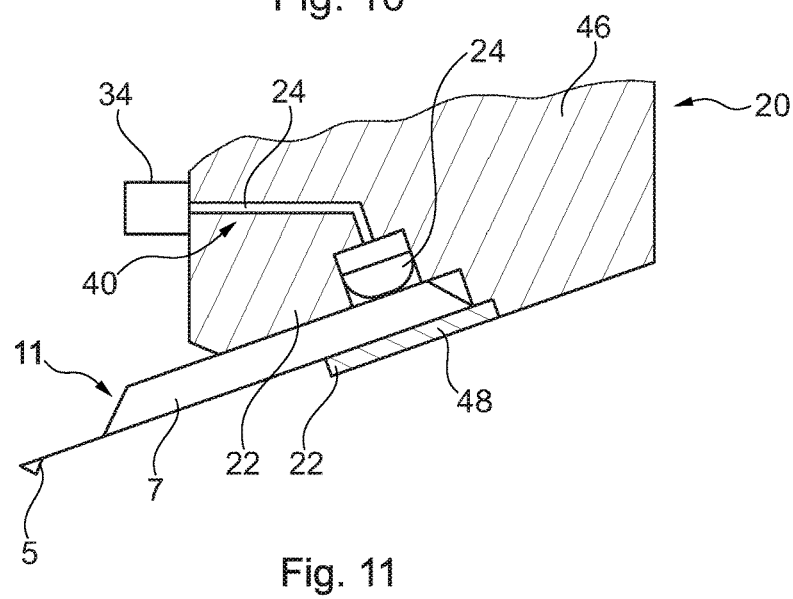

According to an embodiment of the invention, the fixing mechanism may comprise a magnetic element and a non-magnetic bias element which biases the magnetic element in an accommodation cavity of the measuring probe in the inserting unit, wherein the magnetic element is guidable out of the accommodation cavity by means of a magnetic master force which is generated by means of the master force unit. Respective embodiments are shown in FIG. 10 and FIG. 11. The magnetic element may be disengaged from the then detached measuring probe by means of a magnetic master force unit.

According to an embodiment of the invention, the non-magnetic bias element may be selected from the group consisting of a mechanical spring (for example a coil spring, see FIG. 10), a hydraulic bias element and a pneumatic bias element (see FIG. 11).

According to an embodiment of the invention, a scanning probe microscope may be configured as a scanning force microscope. The scanning force microscope, also referred to as an atomic force microscope (AFM), is a special scanning probe microscope. It serves as a tool in surface chemistry and functions for mechanically sensing surfaces and measuring atomic forces on nanometer scale.

According to an embodiment of the invention, the measuring probe may comprise or consist of a probe body for fixing by means of the fixing device and a measuring tip (which may be configured as a carbon nanotube, for example) for sensing the surface.

According to an embodiment of the invention, a surface of the probe body which is facing the measuring tip may be electrically conductive and, in a state fixed to the fixing device, electrically conductively coupled to an electrical measuring unit of the scanning probe microscope for capturing information which is indicative for the electrical properties of the sample body. In particular, the probe body may also comprise a circuit board (for example, a printed circuit board (PCB)) in which an electrical function may be integrated.

According to an embodiment of the invention, it is possible to fix the naked measuring probe in the fixing device. Using auxiliary bodies for accommodating the measuring probe, which impair the reproducibility of the measurement can then be omitted. Thus, according to an embodiment, the mere measuring probe, without being attached to an auxiliary body, may be inserted into the inserting unit and may be fixed by means of the fixing mechanism. Hence, the unitary measuring probe may be directly inserted in the inserting unit. This saves for a user the elaborately and error-prone process of handling the small measuring probe for attaching to an auxiliary body (for example a clamp or the like) before attaching the arrangement of auxiliary body and measuring probe at the fixing device. For the accuracy of the measurement with the scanning probe microscope, it is further advantageous to fasten the measuring probe without an auxiliary body to the fixing device, since the auxiliary body constitutes a disturbing mass which would negatively influence the reproducibility of measurements.

Same or similar components in different figures are provided with the same reference signs.

Before, referring to the figures, exemplary embodiments of the invention are described, some general aspects of the invention and the underlying technology shall be explained:

In order to be able to examine the different properties of the sample surface, it is advantageous that the resolution of the scanning force microscope (e.g., an AFM) is known. The resolution of the AFM device finally is determined by the radius of curvature of the nanoscopic measuring tip at the measuring probe, which is in the order of magnitude of tenths of a nanometer. Depending on the measuring method and measuring time, respectively, the tip is mechanically heavily stressed. Therefore, the measuring probes are regularly exchanged. Due to this reason, measuring probes in AFMs are often considered as a consumable item (material). Therefore, exchanging the measuring probe in the device should be as simple as possible for a user, which, due to the low (small) size of the measuring probe and the highly sensitive measuring probe tip, is problematical and may lead to the destruction of the measuring probe.

Since the cantilever often comprises diamagnetic material, it is not possible to directly fix the cantilever to a magnet in the measuring device. Conventionally, the cantilever is adhered to a ferromagnetic cantilever chip, for example.

A further important parameter in a scanning force microscope is the sensing performance of the measuring actors in the device, which however are limited due to their resonance frequencies. The frequency decreases with increasing mass at the z-actor (or z-direction actor). Depending on the measuring device structure, it is possible to move the sample to be measured and/or the measuring probe. In addition, the motion of the measuring probe does not only mean the motion of the probe mass, but also of the probe fixing and other device parts in this region. Due to this reason, a reduced mass of the measuring probe fixing would be desirable. The contradictory requirements (low mass and high robustness) enforce a compromise between the measuring behavior of the scanning probe microscope and the durability of the measuring probe fixing. In addition, the robustness and the holding force of conventional fixing mechanisms are also limited due to the fact that preferably no part of the measuring probe fixing should protrude below (or beyond) the cantilever tip.

For capturing electrical properties of the sample to be measured with a scanning probe microscope (SPM)/AFM, the measuring probe should either comprise electrically conductive material or should be coated with an electrically conductive layer. Further, an electrical contacting between the scanning probe microscope and the measuring probe should be provided. Due to limitations in the manufacturing method of the measuring probes, it is common to manufacture the measuring probes from semiconductive or nonconductive materials such as silicon or silicon nitride and to apply a metal coating at the bottom side (i.e., the side at which the cantilever tip is located). Thus, it is advantageous to contact the measuring probe in the state mounted in the scanning probe microscope at the bottom side. Since a modification or contamination of each measuring probe should be avoided, for example, a time-consuming adhering of the bottom side of the measuring probe with a wire, exemplary embodiments of the invention constitute a further development of a measuring probe fixing. Furthermore, detaching of the adhesive when measurements are performed under harsh environmental conditions (for example under the influence of a fluctuating temperature and/or a high air humidity) cannot be excluded, which makes the conventional measurement with an adhered cantilever at least very problematic. When the fixing mechanism in the scanning probe microscope comprises a pivoting part (comprising a fixing joint), the pivoting part should be bypassed by means of a wire or a conductive hinge, for example. Problems occur in particular when the wire is stressed by the pivoting motion multiple times per day. This has a negative influence on the durability of the system. A solution with an electrically conductive hinge brings additional complexity into the system, and a correct contacting and isolating of the cantilever from the rest of the scanning probe microscope is impeded.

All conventional solutions have different disadvantages and weak points, respectively. The described clamping units have to be very thin and small in each case, in order to have a negligible mass and to be compatible with the anyhow low space below the measuring probe. The low clamping thickness and low stiffness of the clamping unit however also limits the maximum clamping force. A too large force at the measuring probe would deform the clamp. Therefore, also the clamp length has to be as small as possible, in order to bring the pivot point as near as possible to the measuring probe.

When measuring electrical properties of a sample (in particular electrical conductivity, resistance, piezo electrical properties, surface potential) with a scanning probe microscope, it is usually advantageous to control the electrical potential of the measuring probe. Due to this reason, a permanent and un-interrupted electrical connection between the scanning probe microscope and the bottom side of the measuring probe should exist. The above mentioned solutions with hinge contacts or wire connections, due to their miniature designs, are prone to errors, since they simply lose the electrical contact during the measuring process.

Measuring probes with a small PCB at the bottom side may be directly placed in the carrier and fixed from the top side. The carrier which is present in the scanning probe microscope, in a further embodiment, may be the counterpart of the printed circuits. Thereby, a simple current measurement and thus, for example, topographical measurements can be realized.

Advantageously, according to exemplary embodiments of the invention, there are no spatial limitations when fixing the cantilever (i.e., the measuring probe) is performed from the top side. According to exemplary embodiments, no mechanical joints are necessary, since in a preferred embodiment of the invention, magnets or springs directly push onto the measuring probe from above. The clamping force can simply be achieved, since the measuring performance of the scanning probe microscope can be increased by the mass reduction at the measuring probe, and the robustness of the scanning probe microscope can be increased due to the absence of miniature joints and the simple mechanical design. The fixed carrier, which may form the inserting unit, may for example be connected via three edges to the measuring probe, which provides good stability and does not involve problems during excessive deflection of the cantilever. In case of a clamping fixing, however, the measuring probe can only be fastened at one point from below.

DETAILED DESCRIPTION OF EXEMPLARY EMBODIMENTS

FIG. 1 shows a scanning probe microscope 1 according to an exemplary embodiment of the invention, which is configured as scanning force microscope (e.g., an AFM).

At the scanning probe microscope 1, a cantilever deflection, i.e., a change of a position and a change of a shape, respectively, of a measuring probe 11 (which is also referred to as cantilever) is detected by means of optical sensor technology. An electromagnetic radiation source 2 (for example a laser source) is sending an electromagnetic primary beam 13 (in particular a light beam) via a focusing unit 12 (which may be configured as an arrangement of one or more optical lenses) onto the measuring probe 11. The electromagnetic secondary beam 3 which is reflected from the measuring probe 11 propagates to a photosensitive and position sensitive detector 10 (the electromagnetic secondary beam 3 may in particular be redirected by means of a redirecting mirror 14 or another optical redirecting element to the position sensitive detector 10). When the measuring probe 11 is brought into motion via an actor 4 (which may perform a change of the position in a z-direction which is vertical according to FIG. 1), and/or when the measuring probe 11 changes its shape, a change of the laser light at the position sensitive detector 10 can be detected. Depending on the interaction of a measuring tip 5 (also referred to as cantilever tip) of the measuring probe 11 with a sample body 6 to be examined and characterized, respectively, the deflection of the measuring probe 11 will vary and an associated region at the detector 10 will be hit by the electromagnetic secondary beam 3. The detector signal can then be processed in an evaluation unit 8. The resulting high-resolution image of the surface of the sample body 6 may then be represented by means of a display device 9. A surface of the sample body 6 may be scanned with the measuring tip 5 (i.e., a sensitive tip of the measuring probe 11). A sample table 17 as movable in the plane which is horizontal according to FIG. 1 (i.e., in a x-direction and a y-direction orthogonal with respect to the z-axis) by means of actors 18. The scanning probe microscope 1 thus serves for determining a surface information with respect to the sample body 6 by means of scanningly sensing a surface of the sample body 6 by means of the measuring probe 11.

Further, FIG. 1 schematically illustrates a fixing device 24 temporarily fixing the measuring probe 11 to the scanning probe microscope 1. Embodiments of the fixing device 20 are shown in more detail in FIG. 2 to FIG. 11. The fixing device 20 contains an external master force unit 34 (which is configured as an electromagnet according to FIG. 1) for generating a defined master force by which the measuring probe 11 can selectively be detached from the fixing device 20. The fixing device 20 further comprises an inserting unit 22 which defines an accommodation cavity in which the measuring probe is insertable before fixing to the scanning probe microscope 1 by a user. In addition, a fixing mechanism 24, which is actuatable without a tool, forms a part of the fixing device 20 and serves for detachably fixing the measuring probe 11 which is inserted in the inserting unit 22.

The fixing mechanism 24 is actuatable by means of the master force unit 34 for detaching the measuring probe 11 which is inserted and fixed in the inserting unit 22 without a tool and without contact. In other words, detaching the fixing may be performed by means of exerting an adjustable master force, such that the fixing can be selectively deactivated, wherein the master force can be generated by means of the master force unit 34. The fixing mechanism 24 may be configured, when the master force is switched off (e.g., in a deactivated state of the master force unit 34) to perform the fixing and, when the master force is switched on (e.g., in an activated state of the master force unit 34) to allow detaching of the fixing for inserting the measuring probe 11 into the inserting unit 22 or for removing the measuring probe 11 from the inserting unit 22. The master force which is generated by the master force unit 34 may be a magnetic master force (for example applicable by means of an electrically activatable or enabled master force electro magnet).

As can be seen in FIG. 1 to FIG. 11 and as can be best seen in FIG. 2, the measuring probe 11 comprises a probe body 7 for fixing by means of the fixing device 20 and the measuring tip 5 for sensing the surface of the sample body 6. A surface of the measuring probe 11 which is facing the measuring tip 5 may be electrically conductive and, in a state fixed to the fixing device 20, may be electrically conductively coupled to an electrical measuring unit 45 shown in FIG. 2 of the scanning probe microscope 1 for capturing an information which is indicative for the electrical properties of the sample body 6. A top side of the measuring probe 11, more specifically a top side of the probe body 7 of the measuring probe 11, may have optically reflecting properties or may be provided with an optically reflecting coating, in order to support the above described detection principle.

In another embodiment of the scanning probe microscope 1 which is configured as scanning force microscope, a self-sensitive measuring probe 11 (according to a capacitive detection principle) may be provided. A respective measuring probe 11 in its structure contains parts (not shown) which may have piezo electrical properties. Such a measuring probe 11 may vary its resistance/current-properties, when measuring probe deflections change due to the surface structure of the sample body 6. Such a measuring probe 11 is provided with an electrical contacting, in order to measure the current behavior/resistance behavior in operation. A respective measuring probe 11 may comprise a printed circuit (for example, in the form of a printed circuit board (PCB)) at its bottom side. According to exemplary embodiments of the invention, such measuring probes 11 may be used unmodified, wherein the circuit or the circuits are contacted by means of a counterpart of the fixing device 20.

The following group of fixing principles are characterized by pushing the measuring probe 11 and the cantilever, respectively, by any kind of pushing body in a straight line without redirection by acting or action of a force from above against a contact sheet metal of the fixing device 20. For example, a magnetic clamping is possible which can be implemented directly (in particular by means of attracting and/or repelling and/or reluctance) or indirectly (for example using a toggle lever). Alternatively or additionally, a non-magnetic clamping is possible which also may act directly (for example by means of a compression spring and/or by means of a pneumatic clamping) or indirectly onto the measuring probe 11. In the following, referring to FIG. 2 to FIG. 11, a number of possible embodiments of the fixing device 20 are explained to which the invention is however not limited.

FIG. 2 shows a fixing device 20 according to a preferred embodiment of the invention.

FIG. 2 shows how the measuring probe 11 is accommodated in an accommodation slot of the inserting unit 22. For this purpose, the measuring probe 11 is to be pushed into the accommodation slot, while the fixing mechanism 24 described in the following is deactivated. The accommodation slot is defined as a gap between a sample body-distal upper fixing body 46 and a sample body-near lower fixing body 48. The fixing bodies 46, 48 form a part of the housing of the scanning probe microscope 1. The lower fixing body 48 may comprise or may consist of an electrically conductive material, in order to be able to exchange electrical signals with the measuring probe 11 (see electrical measuring unit 45). As shown in FIG. 2, the measuring probe 11 alone is inserted, i.e., without an auxiliary body which serves for handling the measuring probe 11, in the accommodation slot. In other words, the measuring probe 11 may be inserted into the accommodation slot with a configuration and a structure, respectively, as illustrated in FIG. 2. This has the advantage, that the reproducibility of the sensitive scanning measurement is not falsified or influenced by means of an undefined and significant additional mass of such an auxiliary body.

The fixing mechanism 24 of the fixing device 20 comprises two magnetic elements 30, 32 which here are configured as permanent magnets (alternatively as electro magnets), arranged in an accommodation cavity in the upper fixing body 46. A north pole of the respective magnetic element 30, 32 is referred to as "N" in the figures, whereas a south pole of the respective magnetic element 30, 32 is referred to as "S" in the figures. According to FIG. 2, the two magnetic elements 30, 32 are arranged in the same one of the opposed fixing bodies 46, 48 of the inserting unit 22. In the illustrated embodiment, the magnetic interacting force between the magnetic elements 30, 32 is configured such that the measuring probe 11 which is inserted in the inserting unit 22, is clampingly fixed in the inserting unit 22 by means of this magnetic interacting force. As can be taken from the designations S and N in FIG. 2, respectively, the magnetic elements 30, 32 are repelling each other. Due to this repelling magnetic interacting force, the magnetic elements 30, 32 act upon the measuring probe 11, which is inserted in the inserting unit 22, such that the measuring probe 11 is clampingly fixed in the inserting unit 22. The magnetic element 30 is immovably mounted in the fixing device 20, for example adhered there. The magnetic element 32, in contrast, is movably mounted in the fixing device 20. Under the influence of the repelling magnetic force, the magnetic element 32 is thus pushed in the direction of the accommodation slot of the inserting unit 22 and thus exerts a fixing clamping force onto the measuring probe 11. Advantageously, the inserting unit 22 additionally comprises an optional holding force enhancement element 36 which in the illustrated embodiment is spherical and globular, respectively, which may but does not need to be configured non-magnetically. The holding force enhancement element 36 acts as an intermediate member and force transmitter, respectively, between the magnetic element 32 and the measuring probe 11, which is inserted in the accommodation slot. Thus, when the measuring probe 11 is inserted in the inserting unit 22, the holding force enhancement element 36 directly pushes with a spherically curved contact surface onto the measuring probe 11. The measuring probe 11 is thereby approximately point-shapedly impinged with a strong clamping force.

Thus, according to FIG. 2, a direct magnetic clamping is performed using a repelling magnetic force between the magnetic elements 30, 32. In this repelling variant, the measuring probe 11 and the cantilever, respectively, is also clamped between the contact sheet metal in form of the lower fixing body 48 and the freely movable magnet in form of the magnetic element 32. Above the movable magnetic element 32, the fixed magnetic element 30 is attached, wherein the magnetic elements 30, 32 are relatively oriented with respect to each other, such that the both magnetic elements 30, 32 are repelling each other.

The clamping of the measuring probe 11 between the force enhancement element 36 and the lower fixing body 48 is detached by imprinting the field of the fixed magnetic element 30 by a magnetic field which is oriented opposite thereto, which is repelling the movable magnetic element 32 from the measuring probe 11. In the illustrated embodiment, this is performed by the master force unit 34 which is spatially movable (see double arrow 77) and which is also configured as a permanent magnet, which master force unit 34 can be approximated to magnetic elements 30, 32, in order to detach the clamping, or can be removed from the magnetic elements 30, 32, to let the clamping unhinderedly act upon the measuring probe 11. The natural law that the strength of a magnetic field of a permanent magnet decreases with increasing distance can be advantageously used. Alternatively, by providing the master force unit 34 as a movable permanent magnet, it is also possible to configure the master force unit 34 as (for example, a stationary) electromagnet which can be controlled by applying an electrical activating signal for generating a clamping force detaching counterforce, when the measuring probe 11 shall be removed from the accommodation slot (for example in order to exchange the measuring probe 11).

Thus, according to FIG. 2, the fixing is performed by means of a repelling magnet arrangement (see magnetic elements 30, 32) which pushes on the electrically non-conductive part of the unmodified measuring probe 11 from above (i.e., integrated in the upper fixing body 46) and connects the electrically conductive bottom side of the measuring probe 11 with a fixed electrically conductive carrier (i.e., the lower fixing body 48 which is here configured as contact sheet metal) in the scanning probe microscope 1. This carrier in form of the lower fixing body 48 is further optionally connected to a current source/voltage source and a measuring unit 45, respectively. A piezo actor which is optionally provided in this embodiment is illustrated in FIG. 2 with the reference sign 50.

According to the arrangement shown in FIG. 2, the magnetic field of the master force unit 34 (which here is arranged below the magnetic elements 30, 32) is repelling the magnetic element 32, in order to guide the magnetic element 32 out of the accommodation cavity for detaching the fixing. Alternatively to the arrangement illustrated in FIG. 2, it is also possible to generate a magnetic force by means of the master force unit 34, which magnetic force is attracting the magnetic element 32 (not illustrated). In the latter design, the master force unit 34 could be arranged above the magnetic elements 30, 32, wherein the north pole and the south pole of the master force unit 34 in that case would be interchanged.

Figure 3:
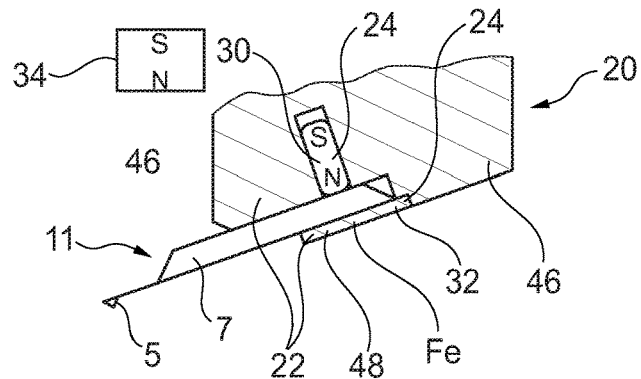

FIG. 3 shows a fixing device 20 according to another exemplary embodiment of the invention.

According to FIG. 3, the two magnetic elements 30, 32 are configured to attract themselves due to their magnetic interacting force and to act upon the measuring probe 11, which is inserted in the inserting unit 22, such that the measuring probe 11 is clampingly fixed in the inserting unit 22. For this purpose, each of the two magnetic elements 30, 32 is arranged in and/or as a part of another of the opposed fixing bodies 46, 48. The now movably mounted magnetic element 30 is slidably arranged in an accommodation cavity of the upper fixing body 46, whereas the now stationary magnetic element 32 is configured as part of the lower fixing body 48 (wherein the designation "Fe" in FIG. 3 indicates that, according to this embodiment, the second magnetic element 32, by means of providing the lower fixing body 48, may be made of ferromagnetic material). Therefore, according to FIG. 3, a magnetic clamping is performed by means of a directly attracting the magnetic elements 30, 32 which sandwich-like engage the measuring probe 11.

In the attractive mode according to FIG. 3, the attractive force between magnetic elements 30, 32 and/or a magnet and a ferromagnetic component is used to clamp the measuring probe 11 and/or the cantilever against the lower fixing body 48 in the form of a contact sheet metal. For this purpose, the contact sheet metal may also be made of a ferritic steel (for example corrosion-resistive chrome steel 1.1274). On the other side of the measuring probe 11 and the cantilever, respectively, a freely movable magnet in form of the magnetic element 30 is located. The attracting force between the magnet and the contact sheet metal leads to clamping the cantilever between both. In order to detach the clamping, either the contact sheet metal can be impinged with a magnetic field from outside which is opposite to the field of the movable magnet and is repelling it. Alternatively, at the opposite side, a magnetic field can be applied which is attracting the freely movable magnet. Both variants may be realized by means of the movable permanent magnetic master force unit 34 or by means of an immovable electromagnetic master force unit 34.

Figure 4:
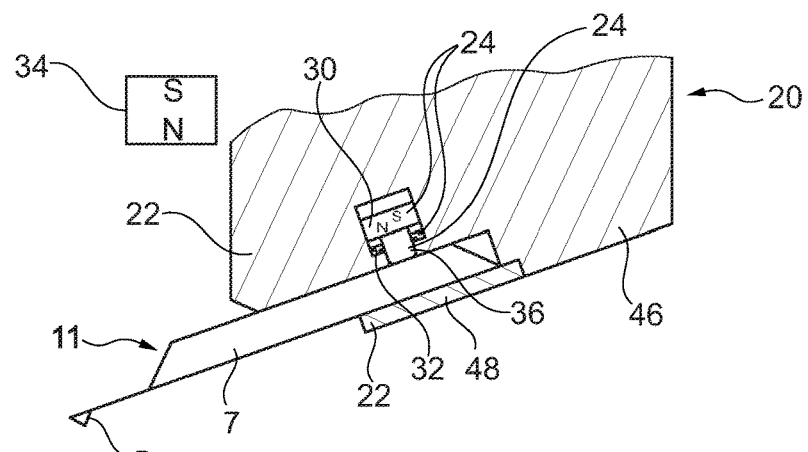

FIG. 4 shows a fixing device 20 according to another exemplary embodiment of the invention.

The embodiment according to FIG. 4 discloses a movable magnetic element 30, an immovable magnetic element 32 and additionally a holding force enhancement element 36 between the movable magnetic element 30 and the measuring probe 11. The magnetic elements 30, 32 are arranged such that an attracting force effect is permanently present and therefore the measuring probe 11 is fixed. The magnetic element 32 is arranged surrounding the holding force enhancement element 36, in particular ring-shapedly, and is firmly embedded in the upper fixing body 46. In the illustrated embodiment, the force enhancement element 36 is configured as a piston with a curved effective surface and a force transfer surface, respectively, which is able to act upon the measuring probe 11 in a force amplifying manner and a force concentrating manner, respectively. According to FIG. 4, the lower fixing body 48 may be configured non-magnetic.

Figure 5:
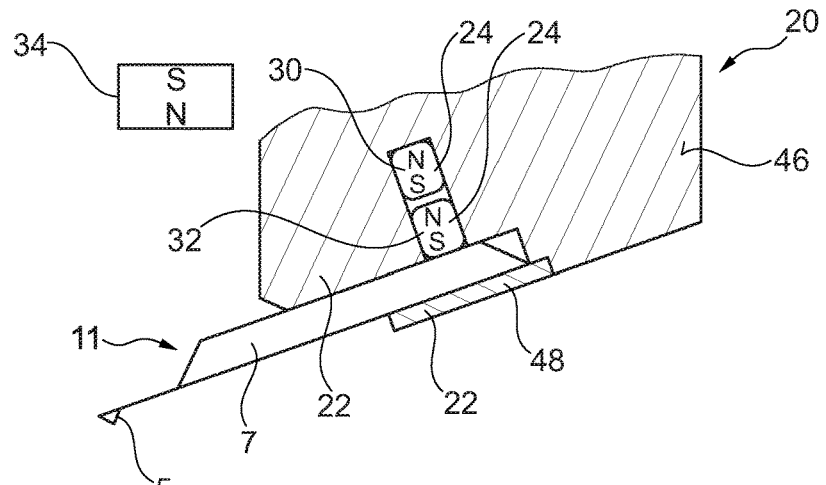

FIG. 5 shows a fixing device 20 according to another exemplary embodiment of the invention.

The embodiment according to FIG. 5 widely corresponds to that of FIG. 2, wherein according to FIG. 5, the holding or adhesion force enhancement element 36 is omitted.

FIG. 6 shows a fixing device 20 according to yet another exemplary embodiment of the invention.

According to FIG. 6, each of the two magnetic elements 30, 32 is arranged in or in proximity to one of two opposing fixing bodies 46, 48, respectively, of the inserting unit 22. Clampingly fixing the measuring probe 11 in the inserting unit 22, according to FIG. 6, is performed by means of a rotating lever mechanism which is described in more detail in the following. In the further repelling variant according to FIG. 6, the measuring probe 11 and the cantilever, respectively, are clamped between the lower fixing body 48 in form of a contact sheet metal and the upper fixing body 46 as part of the housing. In contrast to the above described embodiments, according to FIG. 6, a fixed magnet in form of the permanent magnet 32 is mounted at the lower fixing body 48 and a further fixed magnet in form of the magnetic element 30 is attached to the upper fixing body 46. The magnetic elements 30, 32 are oriented with respect to each other, such that the both magnetic elements 30, 32 are repelling each other. The pivotable lever arm which is realized in form of the lower fixing body 48 including magnetic element 32 is mounted pivotably around a pivot bearing 53. The end of the pivoting arm which is opposing the magnetic elements 30, 32 is firmly clamping the measuring probe 11 between the fixing bodies 46, 48 in the case of repelling magnetic elements 30, 32. The clamping is detached by imprinting the field of the fixed magnet in the contact sheet metal by an oppositely oriented field which pulls upwardly the upper fixing body 48 and/or the carrier above the pivoting point at the pivot bearing 53. Detaching of the clamping may in turn be performed by means of a master force unit 34.

FIG. 7 shows a fixing device 20 according to a further exemplary embodiment of the invention.

According to FIG. 7, the magnetic element 30 contributes to forming a magnetic circuit with an air path. The other magnetic element 32 which here is formed spherically is movably arranged in the air path and is pulled out of the air path and pushed downwardly, respectively, under the influence of a magnetic force which magnetic force inevitably is formed due to the magnetic circuit with magnetic element 30 and the air path. In the embodiment according to FIG. 7, a direct clamping is thus performed from above under a utilization of the principle of reluctance. In this embodiment, a magnetic circuit is built which is guided in a ferromagnetic material, which magnetic circuit comprises a short air path directly above the measuring probe 11 and the cantilever, respectively. A freely movable, ferromagnetic pressure body, preferably a sphere, is pulled into the gap, since the magnetic resistance of the air path is significantly reduced in this way. This effect is used to exert a pressure force onto the cantilever by means of the pressure body. In order to release the clamping, the pressure body is pulled out of the air gap again by means of the master force unit 34. This may be performed by means of the master force unit 34 mechanically (for example by means of a spring and/or a lever), pneumatically (for example by means of a negative pressure above the pressure body) and/or by a further magnetic field.

In the following, embodiments are described in which an indirect magnetic clamping is used. The concepts of the following embodiments go back to a kind of force-redirecting, in order to push the measuring probe 11 and the cantilever, respectively, from above against the lower fixing body 48 in form of a contact metal sheet.

FIG. 8 shows a respective fixing device 20 according to an exemplary embodiment of the invention.

The fixing mechanism 24 according to FIG. 8 comprises, in the absence of a master force, a substantially C-shaped curved element which is configured to become uncurved when the master force is acting (that is, to reduce its curvature and consequently to approximate a straight lined configuration) and therefore, under formation of a clamping fixing of the measuring probe 11, to extend up to an accommodation cavity of the measuring probe 11 in the inserting unit 22. According to FIG. 8, the curved element 24 comprises a material with a shape memory (for example Nitinol) which, when a thermal master force is acting, becomes at least partially uncurved. An associated master force unit 34 therefore is configured as heating unit and/or cooling unit which can modify the curved element by means of a targeted heating and cooling, respectively, to the curved or uncurved configuration and can thereby be switched back and forth between "detaching" and "fixing". Therefore, it is possible to use a shape memory-metal which experiences a defined deformation under heat exposure.

Figure 9:
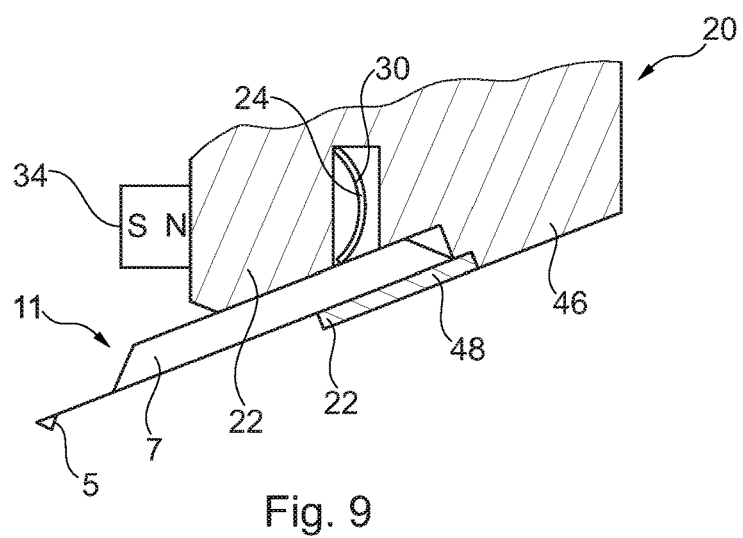

FIG. 9 shows a fixing device 20 according to a further exemplary embodiment of the invention. According to FIG. 9, the curved element 24 comprises a magnetic material which, when a magnetic master force is acting, becomes at least partially uncurved. Alternatively to FIG. 8, according to FIG. 9, it is also possible to use a ferromagnetic sheet metal which is erected by means of a magnet, in order to experience a defined deformation. In a recess above the cantilever, the ferromagnetic sheet metal is located which, in the force-free state, is slightly bent. When a magnetic field is applied from a side, such as by master force unit 34, the sheet metal is straightly bent, erects and thereby is clamping the cantilever against the contact sheet metal. The concept according to FIG. 9 thus uses, such as also the concept according to FIG. 8, the principle of the toggle lever.

The embodiments described in the following perform a direct non-magnetic clamping and are characterized in that the cantilever is pushed against the contact sheet metal from below by means of any kind of pressure body in a straight line without redirecting. In these embodiments, the source of the pressure force however is non-magnetic.

FIG. 10 shows a fixing device 20 according to such an exemplary embodiment of the invention.

The fixing mechanism 24 according to FIG. 10 comprises a magnetic element 30 and a non-magnetic bias element 38 which biases the magnetic element 30 in an accommodation cavity for accommodating the measuring probe 11 in the inserting unit 22. Without external master force, the non-magnetic bias element 38 thus pushes the magnetic element 30 into the accommodation cavity for inserting the measuring probe 11. However, the magnetic element 30 is guidable out of the accommodation cavity by means of a magnetic master force which is exerted by means of the master force unit 34. The non-magnetic bias element 38 according to FIG. 10 is a mechanical spring. In this variant, the cantilever is clamped from above via a ferromagnetic pressure body—preferably a sphere—against the contact metal sheet by means of a mechanical spring. By applying a magnetic field, the pressure body can be pulled away again from the cantilever against the mechanical spring.

FIG. 11 shows a fixing device 20 according to an exemplary embodiment of the invention. According to FIG. 11, the non-magnetic bias element 38 is a pneumatic bias element. In this variant, the cantilever is clamped against the contact sheet metal from above via a pressure body—preferably a sphere or a body with a section with a spherical surface—by means of applying an overpressure at the side of the pressure body which is facing away from the cantilever. By releasing the overpressure or even applying a negative pressure at the respective location, controlled by the pneumatic master force unit 34, the clamping can be detached. Alternatively, the pressure body can be pulled away from the cantilever by applying a magnetic field. A pneumatic control pressure can be generated by means of the master force unit 34 and can be transferred to the pressure body of the fixing mechanism 24 via a pressure conduit 40.

Figure 12:
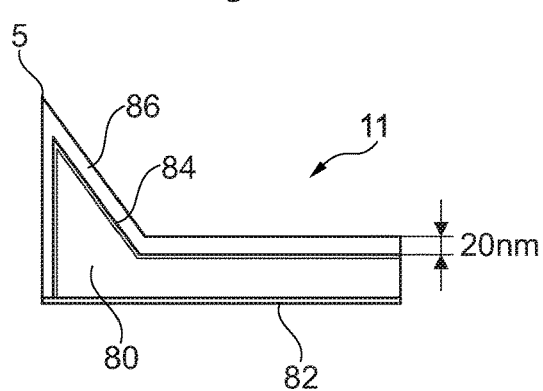
FIG. 12 shows a measuring probe for a scanning probe microscope as it can be directly and without additional components inserted into a fixing device according to an exemplary embodiment of the invention.

FIG. 12 shows a measuring probe 11 which is also referred to as cantilever for a scanning probe microscope 1, as it can be directly and without additional components inserted in a fixing device 22 according to an exemplary embodiment of the invention. The measuring probe 11 contains a core or basis body 80 for providing mechanical stability, which may for example be made of silicon or silicon nitride. At a bottom side of the basis body 80, a reflection coating 82 is attached which is configured for detecting a change of a position of the measuring probe 11 when scanning a sample surface to be examined. If the scanning probe microscope 1 is not based on an optical detection, the reflection coating 82 can be omitted. A top side of the basis body 80 is coated with an optional adhesive layer 84 (for example made of titanium) and an electrically conductive layer 86 (for example made of platinum) which is attached thereupon. The adhesion layer 84 improves the adhering of the electrically conductive layer 86. The electrically conductive layer 86 serves for detecting electrical signals when scanning a surface of a sample body 6 to be examined and may be omitted when such an electrical measurement shall not be performed. The measuring probe 11 further contains the measuring tip 5 which may be configured as a carbon nanotube, for example.

Complementary, it should be noted that "comprising" does not exclude other elements or steps and "a" or "an" does not exclude a multiplicity. Further it should be noted that features or steps which are described with reference to one of the above embodiments may be also used in combination with other features or steps of other above described embodiments. Reference signs in the claims shall not be construed as limiting.

The invention claimed is:

1. A device for selectively fixing a measuring probe of a scanning probe microscope which comprises:
    an inserting unit, in which the measuring probe is insertable,
    wherein the inserting unit comprises an accommodation slot, in which the measuring probe can be accommodated, and
    wherein the mere measuring probe without being attached to an auxiliary body is insertable into the accommodation slot of the inserting unit; and
    a master force unit for selectively exerting a master force on a fixing mechanism which is actuatable without a tool,
    wherein the fixing mechanism is responsive to the master force unit for detaching and/or fixing the measuring probe by controlling an interactive force when the measuring probe is inserted in the inserting unit,
    wherein the fixing mechanism is configured such that, when the master force is disabled, the measuring probe is fixed to the inserting unit, and when the master force is enabled, the measuring probe is detached from the inserting unit, and
    wherein the master force unit is selected from the group consisting of a master force unit for exerting a magnetic master force, an electrical master force, a thermal master force.

2. The device according to claim 1, wherein the master force unit is configured for controlling the detaching and/or the fixing by exerting an adjustable master force.

3. The device according to claim 1, wherein the inserting unit comprises a holding force enhancement element with a curved adhesion force transmission surface which, in a state of the measuring probe inserted in the inserting unit, directly acts upon the measuring probe.

4. The device according to claim 1, wherein the fixing mechanism comprises at least two magnetic elements whose magnetic interacting force is configured for clampingly fixing the measuring probe.

5. The device according to claim 4, wherein the at least two magnetic elements are configured to repel each other due to their magnetic interacting force and to act upon the measuring probe, which is inserted in the inserting unit, such that the measuring probe is clampingly fixed in the inserting unit.

6. The device according to claim 5, comprising at least one of the following features:
    wherein the at least two magnetic elements are arranged in and/or at the same of two opposing fixing bodies of the fixing device, between which the measuring probe is arranged in the state inserted in the inserting unit;
    wherein each of the two magnetic elements are arranged in and/or at respective opposed fixing bodies of the fixing device, between which the measuring probe is arranged in the state inserted in the inserting unit, and the clampingly fixing of the measuring probe in the inserting unit is performable by a rotating lever mechanism.

7. The device according to claim 4, wherein the at least two magnetic elements are configured to attract each other due to their magnetic interacting force and to act upon the measuring probe, which is inserted in the inserting unit, such that the measuring probe is clampingly fixed in the inserting unit.

8. The device according to claim 7, wherein each of the two magnetic elements is arranged in and/or at another of two opposing fixing bodies of the fixing device, between which the measuring probe is arranged in the state inserted in the inserting unit.

9. The device according to claim 4, comprising at least one of the following features:
    wherein one of the magnetic elements is movably mounted and the other one of the magnetic elements is immovably mounted in and/or at the fixing device;
    wherein one of the magnetic elements forms a part of a magnetic circuit with an air path and the other one of the magnetic elements is movably arranged in the air path and is pulled out of it under the influence of a magnetic force.

10. The device according to claim 1, wherein the fixing mechanism comprises an element which is curved in the absence of a master force generated by the master force unit, which element is configured, when the master force is acting, to become at least partially uncurved and thereby, under formation of a clamping fixing of the measuring probe, to extend up to an accommodation cavity of the measuring probe in the inserting unit.

11. The device according to claim 10, comprising at least one of the following features:
    wherein the curved element comprises a magnetic material, which, when a magnetic master force which is generated by the master force unit is acting, becomes at least partially uncurved;
    wherein the curved element comprises a material with shape memory, which, when a thermal master force which is generated by the master force unit is acting, becomes at least partially uncurved.

12. The device according to claim 1, wherein the fixing mechanism comprises a magnetic element and a non-magnetic bias element which biases the magnetic element in an accommodation cavity of the measuring probe in the inserting unit, wherein the magnetic element is guidable out of the accommodation cavity by a magnetic master force generated by the master force unit.

13. The device according to claim 12, wherein the non-magnetic bias element is selected from the group consisting of a mechanical spring, a hydraulic bias element and a pneumatic bias element.

14. A scanning probe microscope for determining a surface information with respect to a sample body by scanningly sensing a surface of the sample body which comprises:
a measuring probe which is adapted for scanningly sensing the surface of the sample body; and
a fixing device for selectively fixing the measuring probe, wherein the fixing device comprises:
an inserting unit, in which the measuring probe is insertable,
wherein the inserting unit comprises an accommodation slot, in which the measuring probe can be accommodated, and
wherein the mere measuring probe without being attached to an auxiliary body is insertable into the accommodation slot of the inserting unit; and
a master force unit for selectively exerting a master force on a fixing mechanism which is actuatable without a tool, wherein the fixing mechanism is responsive to the master force unit for detaching and/or fixing the measuring probe by controlling an interactive force when the measuring probe is inserted in the inserting unit,
wherein the fixing mechanism is configured such that, when the master force is disabled, the measuring probe is fixed to the inserting unit, and when the master force is enabled, the measuring probe is detached from the inserting unit, and
wherein the master force unit is selected from the group consisting of a master force unit for exerting a magnetic master force, an electrical master force, a thermal master force.

15. The scanning probe microscope according to claim 14, configured as a scanning force microscope.

16. The scanning probe microscope according to claim 14, wherein the measuring probe comprises:
a probe body for fixing by the fixing device; and
a measuring tip which includes a carbon nanotube, for sensing the surface.

17. The scanning probe microscope according to claim 16, comprising at least one of the following features:
wherein a surface of the probe body which is facing the measuring tip is electrically conductive and, in a state fixed to the fixing device, electrically conductively coupled to an electrical measuring unit of the scanning probe microscope for capturing an information indicative for the electrical properties of the sample body;
wherein the probe body comprises an electric circuit;
wherein the probe body comprises a reflection coating for reflecting electromagnetic measuring radiation of the scanning probe microscope.

18. A method for selectively fixing a measuring probe of a scanning probe microscope, which comprises:
inserting a measuring probe into an inserting unit of the scanning probe microscope, including:
accommodating the measuring probe in an accommodation slot of the inserting unit, wherein the mere measuring probe without being attached to an auxiliary body is inserted into the accommodation slot of the inserting unit; and
toollessly actuating a fixing mechanism by applying a master force for controllably manipulating the measuring probe between one of a detached condition and a fixed condition by controlling an interactive force,
wherein the fixing mechanism is configured such that, when the master force is disabled, the measuring probe is fixed to the inserting unit, and when the master force is enabled, the measuring probe is detached from the inserting unit, and
wherein the master force unit is selected from the group consisting of a master force unit for exerting a magnetic master force, an electrical master force, a thermal master force.

19. The method according to claim 18, wherein the measuring probe is fixed by the fixing mechanism.

20. A device for selectively fixing a measuring probe of a scanning probe microscope, the device comprising:
an inserting unit with an accommodation slot in which the measuring probe can be accommodated, wherein the measuring probe without being attached to an auxiliary body is insertable into the accommodation slot of the inserting unit; and
a master force unit for selectively exerting a master force on a fixing mechanism which is actuatable without a tool, wherein the master force unit is selected from the group consisting of a master force unit for exerting a magnetic master force, an electrical master force, or a thermal master force,
wherein the fixing mechanism is responsive to the master force unit for detaching and/or fixing the measuring probe by controlling an interactive force when the measuring probe is inserted in the inserting unit,
wherein the fixing mechanism is configured such that when the master force is disabled, the measuring probe is fixed to the inserting unit, and when the master force is enabled, the measuring probe is detached from the inserting unit,
wherein at least one of the fixing mechanism and the master force unit comprise at least one magnetic element.

* * * * *